(12) United States Patent
Kanegae et al.

(10) Patent No.: US 11,378,212 B2
(45) Date of Patent: Jul. 5, 2022

(54) QUICK CONNECTOR

(71) Applicant: Sumitomo Riko Company Limited, Komaki (JP)

(72) Inventors: Ryousuke Kanegae, Komaki (JP); Kazushige Sakazaki, Komaki (JP); Makoto Ito, Komaki (JP)

(73) Assignee: Sumitomo Riko Company Limited, Komaki (JP)

( * ) Notice: Subject to any disclaimer, the term of this patent is extended or adjusted under 35 U.S.C. 154(b) by 303 days.

(21) Appl. No.: 16/858,888

(22) Filed: Apr. 27, 2020

(65) Prior Publication Data

US 2020/0256493 A1 Aug. 13, 2020

Related U.S. Application Data

(63) Continuation of application No. PCT/JP2019/014427, filed on Apr. 1, 2019.

(30) Foreign Application Priority Data

Apr. 26, 2018 (JP) .............................. JP2018-084830

(51) Int. Cl.
*F16L 37/14* (2006.01)

(52) U.S. Cl.
CPC ............. *F16L 37/14* (2013.01); *F16L 37/144* (2013.01)

(58) Field of Classification Search
CPC ...... F16L 37/14; F16L 2201/10; F16L 37/144
See application file for complete search history.

(56) References Cited

U.S. PATENT DOCUMENTS

| 9,816,658 B2* | 11/2017 | Ishizaka ................ F16L 37/144 |
| 9,915,388 B2* | 3/2018 | Hatanaka .............. F16L 37/144 |
| 10,323,782 B2 | 6/2019 | Hatanaka |
| 10,502,354 B2* | 12/2019 | Terada .................. F16L 37/144 |

(Continued)

FOREIGN PATENT DOCUMENTS

| CN | 105765286 A | 7/2016 |
| JP | 2015-48917 A | 3/2015 |
| JP | 5753284 B1 | 7/2015 |

(Continued)

OTHER PUBLICATIONS

May 27, 2021 Office Action issued in Chinese Patent Application No. 201980011429.1.

(Continued)

*Primary Examiner* — James M Hewitt, II
(74) *Attorney, Agent, or Firm* — Oliff PLC

(57) ABSTRACT

A pair of first leg portions of a retainer have first taper surfaces at distal end sides on surfaces on the side to which a first pipe is to be inserted. The first taper surfaces cause the retainer to move from an initial position to an insertion position by an axial-direction pressing force from an annular protrusion, during a period until the first pipe is inserted to a regular position. During the period until the first pipe is inserted to the regular position, a pair of second leg portions restrict the retainer from moving from the initial position to a confirmation position. In a state in which the first pipe is inserted to the regular position, the pair of second leg portions allow the retainer to move from the initial position to the confirmation position.

8 Claims, 11 Drawing Sheets

(56) References Cited

U.S. PATENT DOCUMENTS

2016/0230913 A1  8/2016  Hatanaka
2017/0248263 A1  8/2017  Terada et al.

FOREIGN PATENT DOCUMENTS

| JP | 6149081 B2 | 6/2017 | |
|---|---|---|---|
| WO | WO-2015107788 A1 * | 7/2015 | .......... F16L 37/0885 |
| WO | WO-2017051684 A1 * | 3/2017 | ............ F16L 37/144 |

OTHER PUBLICATIONS

Jun. 18, 2019 International Search Report issued in International Patent Application No. PCT/JP2019/014427.
Jun. 18, 2019 Written Opinion issued in International Patent Application No. PCT/JP2019/014427.

* cited by examiner

QUICK CONNECTOR

CROSS REFERENCE TO RELATED APPLICATIONS

The present application is a Continuation Application of International Application No. PCT/JP2019/014427, filed on Apr. 1, 2019, which is incorporated herein by reference. The present invention is based on Japanese Patent Application No. 2018-084830, filed on Apr. 26, 2018, the entire contents of which are incorporated herein by reference.

BACKGROUND OF THE INVENTION

1. Field of the Invention

The present invention relates to a quick connector.

2. Description of the Related Art

JP6149081B2, JP5753284B1, and JP2015-48917A disclose quick connectors that allow confirmation that a first pipe (metal pipe) made of metal has been inserted to a regular position, by a retainer, and fully prevent the first pipe from coming off, by the retainer. Further, in a state in which the first pipe is inserted to the regular position and the retainer is at an initial position before moving to a confirmation position, the retainer provisionally prevents the first pipe from coming off.

More specifically, when the first pipe is inserted into a connector body, a pair of leg portions are pressed against an annular protrusion of the first pipe, whereby the leg portions are expanded and thus the first pipe is allowed to be inserted to the regular position in the connector body. When the first pipe is inserted to the regular position, the expansion amount of the pair of leg portions reduces, so that the pair of leg portions are engaged with the annular protrusion of the first pipe. Thus, the retainer provisionally prevents the first pipe from coming off.

SUMMARY OF INVENTION

However, in the quick connectors disclosed in JP6149081B2, JP5753284B1, and JP2015-48917A, during a period until the first pipe is inserted to the regular position, the annular protrusion of the first pipe presses the pair of leg portions in the axial direction, and the pair of leg portions are expanded by the axial-direction pressing force from the annular protrusion. That is, in order that the annular protrusion of the first pipe comes to the regular position, the pair of leg portions need to expand to the extent that allows the annular protrusion of the first pipe to pass therebetween. In particular, since a part for provisional prevention in the retainer is provided to the pair of leg portions, the amount of radially inward protrusion of the pair of leg portions is great. The force needed for expanding the pair of leg portions to the extent that allows the annular protrusion to pass therebetween corresponds to the insertion load of the first pipe.

An object of the present invention is to provide a quick connector that enables reduction of the insertion load of the first pipe.

A quick connector according to the present invention includes: a connector body into which a first pipe having an annular protrusion is to be inserted; and a retainer configured to be movable from an initial position to a confirmation position relative to the connector body through push-in operation in a direction crossing an axial direction of the connector body in a state in which the first pipe is inserted to a regular position in the axial direction of the connector body, the retainer being configured to be engaged with the annular protrusion in the axial direction at the confirmation position so as to prevent the first pipe from coming off.

The retainer is movable to an insertion position opposite to the confirmation position from the initial position, and has a return force for returning to the initial position in a state in which the retainer is at the insertion position. The retainer includes a base portion, a pair of first leg portions extending in a push-in direction from both ends of the base portion, and a pair of second leg portions extending in the push-in direction from both ends of the base portion and provided independently of the pair of first leg portions, the pair of second leg portions being expandable more greatly than the pair of first leg portions, the pair of second leg portions being located on a side opposite to a side to which the first pipe is to be inserted, with respect to the pair of first leg portions.

The pair of first leg portions have first taper surfaces, at distal end sides of the pair of first leg portions, on surfaces on the side to which the first pipe is to be inserted. The first taper surfaces cause the retainer to move from the initial position to the insertion position by an axial-direction pressing force from the annular protrusion, during a period until the first pipe is inserted to the regular position.

During the period until the first pipe is inserted to the regular position, the pair of second leg portions are engaged with the connector body so that the retainer is restricted from moving from the initial position to the confirmation position. In a state in which the first pipe is inserted to the regular position, when the pair of second leg portions expand due to contact with an outer circumferential surface of the annular protrusion, the engagement with the connector body is released, thus allowing the retainer to move from the initial position to the confirmation position.

According to the present invention, the expansion amount of the pair of first leg portions is smaller than that of the pair of second leg portions. That is, the pair of first leg portions are not expandable or are expandable with only a slight expansion amount. The first taper surfaces are formed, at the distal end sides of the pair of first leg portions, on the surface on the side to which the first pipe is inserted. Therefore, during a period until the first pipe is inserted to the regular position, the annular protrusion of the first pipe presses the first taper surfaces of the pair of first leg portions in the axial direction. At this time, the first taper surfaces cause the retainer to move from the initial position to the insertion position by the axial-direction pressing force from the annular protrusion of the first pipe. The retainer has a return force for returning to the initial position in a state in which the retainer is at the insertion position. Therefore, during a period until the first pipe is inserted to the regular position, the retainer moves from the initial position to the insertion position against the return force. During this period, the pair of first leg portions do not need to expand.

Further, according to the present invention, the return force of the retainer is freely set. In the conventional case, during a period until the first pipe is inserted to the regular position, the pair of leg portions need to expand to the extent that allows the annular protrusion of the first pipe to pass therebetween. That is, the return force of the retainer in the conventional case is the return force in a state in which the pair of leg portions are expanded to the extent that allows the annular protrusion of the first pipe to pass therebetween. The insertion load of the first pipe depends on the return force of the retainer described above. Therefore, according to the present invention, the insertion load of the first pipe is reduced as compared to the conventional case.

DESCRIPTION OF THE EMBODIMENTS (1. Outline of Quick Connector 1)

The outline of a quick connector 1 will be described with reference to FIG. 1 and FIG. 7F. The quick connector 1 forms a part of a fuel supply path of an automobile, for example. An end of a first pipe 3 is inserted to a first end side of the quick connector 1, and an end of a second pipe 4 is externally fitted to a second end side of the quick connector 1. Thus, the quick connector 1 connects the first pipe 3 and the second pipe 4.

Figure 1:
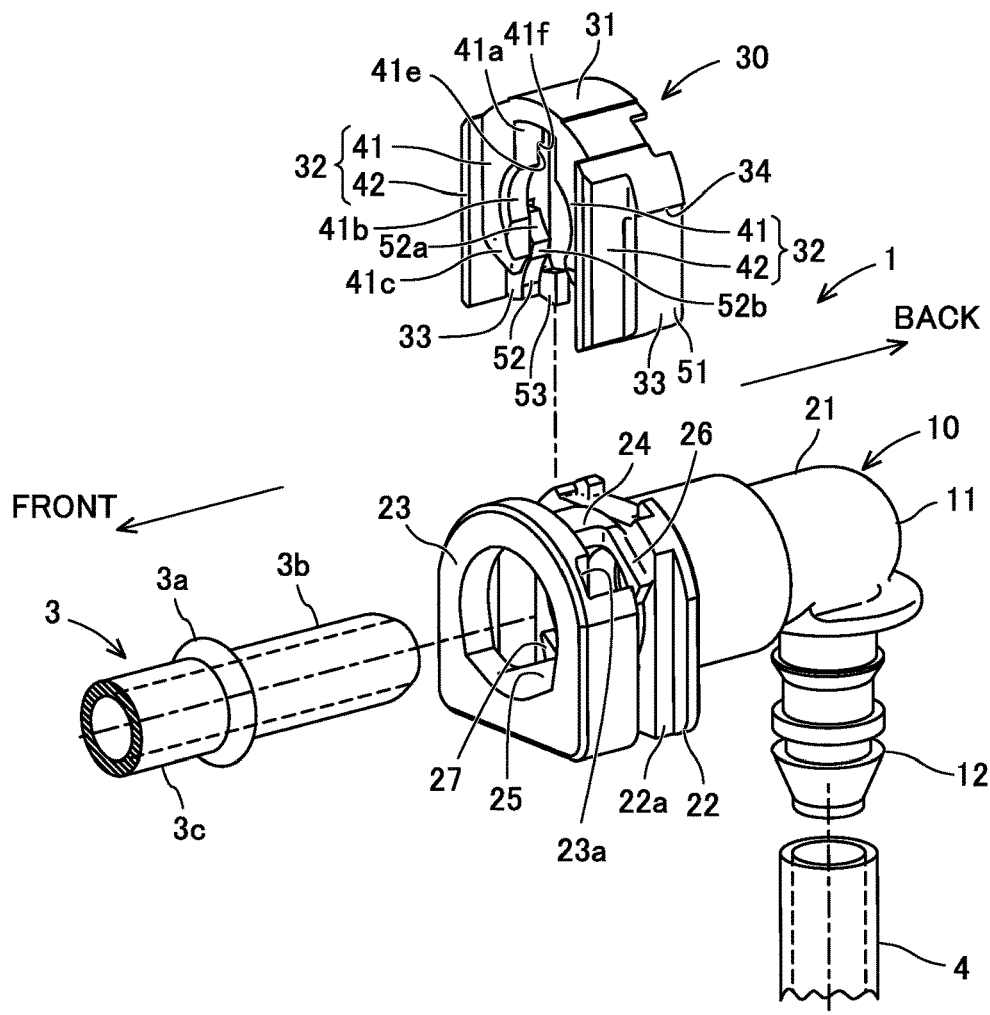
FIG. 1 is a perspective view showing a connector body 10 and a retainer 30 composing a quick connector 1, a first pipe 3, and a second pipe 4 before assembly.

Here, the first pipe 3 is, for example, made of metal and formed in a tubular shape, as shown in FIG. 1. The first pipe 3 has an annular protrusion 3a (also called flange or bead) formed so as to protrude outward in the radial direction at a position distant in the axial direction from the endmost point by a predetermined distance, an end tube portion 3b which is a small-diameter part on the end side with respect to the annular protrusion 3a, and a non-end tube portion 3c which is a small-diameter part on the non-end side with respect to the annular protrusion 3a.

As shown in FIG. 1, the second pipe 4 is made of resin and formed in a long tubular shape. The second pipe 4 is a pipe connecting the quick connector 1 and another member. The second pipe 4 is more deformable than the quick connector 1. Therefore, the end of the second pipe 4 is externally fitted to the second end side of the quick connector 1 by deforming to expand.

In the following description, the axial direction is the axial direction of the first pipe 3 in a state in which the first pipe 3 is inserted into the quick connector 1. In the quick connector 1, the side to which the first pipe 3 is inserted is defined as the front side in the axial direction (corresponding to the first pipe insertion side), and the opposite side is defined as the back side in the axial direction (corresponding to the side opposite to the first pipe insertion side). The downward direction is a direction in which a retainer 30 composing the quick connector 1 is pushed-in, as seen in the axial direction of the first pipe 3, and the upward direction is a direction in which the retainer 30 is pulled out (direction opposite to the push-in direction). The left-right direction is a direction perpendicular to the up-down direction, as seen in the axial direction of the first pipe 3.

Figure 7A:
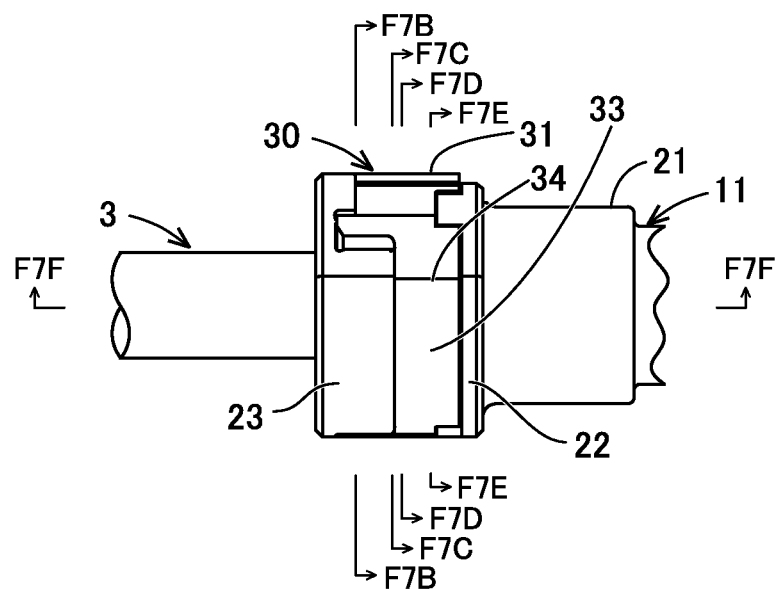
FIG. 7A is a side view showing a state in which the retainer 30 is moved from the initial position to a confirmation position (confirmation state)
Figure 7B:
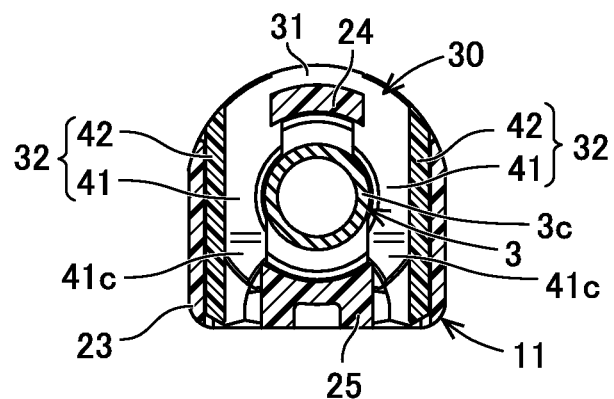
FIG. 7B is a sectional view along line F7B-F7B in FIG. 7A.
Figure 7C:
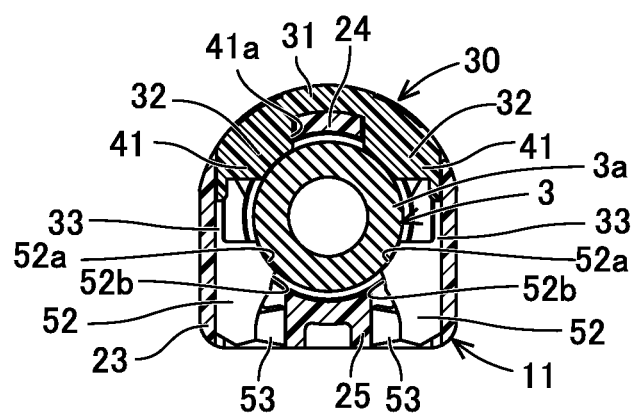
FIG. 7C is a sectional view along line F7C-F7C in FIG. 7A.
Figure 7D:
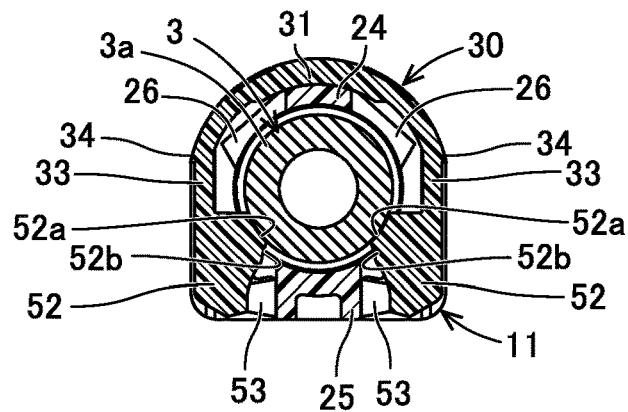
FIG. 7D is a sectional view along line F7D-F7D in FIG. 7A.
Figure 7E:
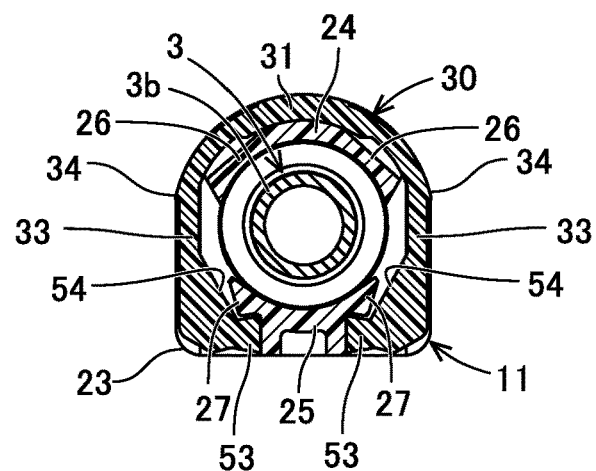
FIG. 7E is a sectional view along line F7E-F7E in FIG. 7A.
Figure 7F:
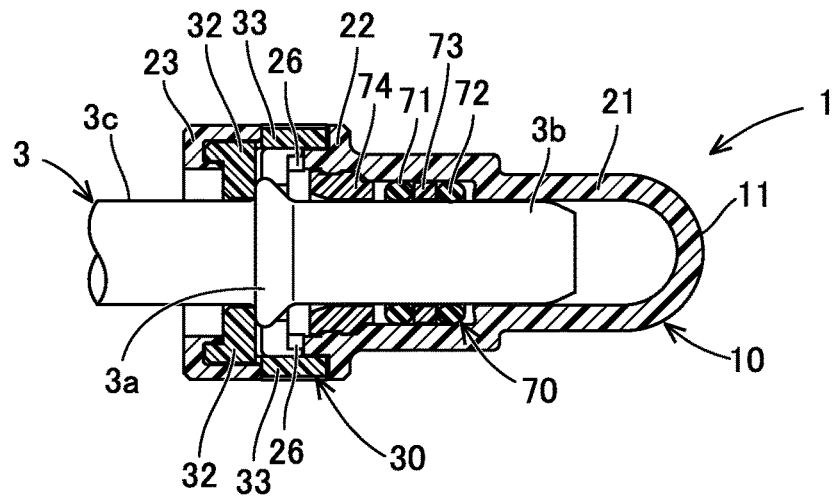
FIG. 7F is a sectional view along line F7F-F7F in FIG. 7A.

The quick connector 1 includes the connector body 10, the retainer 30, and a seal unit 70 (shown in FIG. 7F). The connector body 10 is made of hard resin, e.g., glass fiber reinforced polyamide. The connector body 10 has a flowpath penetrating therethrough. Here, the connector body 10 is shaped in an L-shaped penetration form. However, other than this, the connector body 10 may be shaped in a penetration form bent at an optional angle, or may be shaped in a straight penetration form. The connector body 10 may be formed of one component, or may be formed by combining a plurality of components.

As shown in FIG. 1, the connector body 10 has a first pipe insertion portion 11 and a second pipe connection portion 12. The first pipe insertion portion 11 is provided on the first end side (front upper side in FIG. 1) of the connector body 10, and the end tube portion 3b and the annular protrusion 3a of the first pipe 3 are to be inserted into the first pipe insertion portion 11.

As shown in FIG. 7F, the seal unit 70 is provided on the inner circumferential side of the first pipe insertion portion 11. The seal unit 70 includes annular seal members 71, 72 made of fluororubber or the like, a collar 73 made of resin and sandwiched in the axial direction between the annular seal members 71, 72, and a bush 74 made of resin and positioning the annular seal members 71, 72 and the collar 73 in the connector body 10. The end tube portion 3b of the first pipe 3 is inserted on the inner circumferential side of the seal unit 70. The bush 74 allows the end tube portion 3b of the first pipe 3 to pass, but does not allow the annular protrusion 3a to pass. That is, the bush 74 has a function of restricting the annular protrusion 3a of the first pipe 3 from moving to the back side in the axial direction.

The second pipe connection portion 12 is provided on the second end side of the connector body 10 (back lower side in FIG. 1), and the end of the second pipe 4 is externally fitted to the second pipe connection portion 12. The outer circumferential surface of the second pipe connection portion 12 is formed in a stepped shape in a direction along the flow path in order to obtain a come-off prevention force in a state in which the second pipe 4 is fitted.

The retainer 30 is made of hard resin, e.g., glass fiber reinforced polyamide. The retainer 30 is provided to the connector body 10 so as to be movable through operator's push-in operation and pull-out operation in an axis crossing direction (direction crossing the first pipe insertion axial direction of the connector body 10: up-down direction in FIG. 1). The retainer 30 is movable to an initial position, an insertion position, and a confirmation position relative to the connector body 10. The confirmation position is a position that allows confirmation that the first pipe 3 has been inserted to the regular position. The insertion position is on the side opposite to the confirmation position from the initial position. The insertion position is a position to which the retainer 30 is moved at the time of inserting the first pipe 3.

In a state in which the first pipe 3 is inserted to the regular position in the axial direction of the connector body 10, the retainer 30 is allowed to move from the initial position to the confirmation position. On the other hand, in a state in which the first pipe 3 is not inserted into the connector body 10, and during a period until the first pipe 3 is inserted to the regular position of the connector body 10, the retainer 30 is restricted from moving from the initial position to the confirmation position. Therefore, when the retainer 30 is allowed to be pushed-in to the confirmation position, the operator confirms that the first pipe 3 has been inserted to the regular position.

In a state in which the retainer 30 is pushed-in to the confirmation position, the retainer 30 is engaged with the annular protrusion 3a of the first pipe 3 in the axial direction so that the retainer 30 prevents the first pipe 3 from coming off. That is, when the retainer 30 has been pushed-in, the operator confirms that the first pipe 3 has been inserted to the regular position and the first pipe 3 is prevented by the retainer 30 from coming off.

During a period until the first pipe 3 is inserted to the regular position in the axial direction of the connector body 10, the retainer 30 moves from the initial position to the insertion position by the axial-direction pressing force from the annular protrusion 3a of the first pipe 3. That is, during a period until the first pipe 3 is inserted to the regular position, the retainer 30 moves from the initial position toward a direction opposite to the push-in direction. In a state in which the retainer 30 is at the insertion position, the retainer 30 has a return force to return to the initial position.

(2. Detailed Structure of First Pipe Insertion Portion 11)

Figure 2:
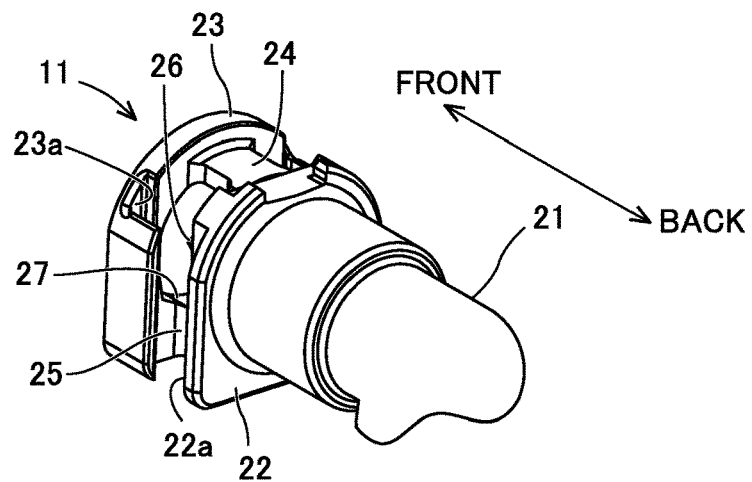
FIG. 2 is a perspective view of a first pipe insertion portion 11 of the connector body 10 shown in FIG. 1, as seen from the back side.

The detailed structure of the first pipe insertion portion 11 of the connector body 10 will be described with reference to FIG. 1 and FIG. 2. The first pipe insertion portion 11 includes a tube body 21, a back slide guide 22, a front slide guide 23, an upper connection member 24, a lower connection member 25, a pair of body expanding guides 26, 26, and a pair of push-in engaged members 27, 27.

The tube body 21 is located on the back side of the first pipe insertion portion 11, and the second pipe connection portion 12 is connected to an end of the tube body 21. On the inner circumferential side of the tube body 21, the seal unit 70 is provided and the end tube portion 3b of the first pipe 3 is inserted. The back slide guide 22 is provided integrally at the front end surface of the tube body 21, and has a hole coaxially communicating with a hole of the tube body 21. The hole of the back slide guide 22 is formed in such a size that allows the end tube portion 3b of the first pipe 3 and the seal unit 70 to pass therethrough. A pair of slide guide surfaces 22a, 22a extending straight in the up-down direction are formed at the left and right on the front surface of the back slide guide 22.

The front slide guide 23 is located so as to be distant frontward in the axial direction from the back slide guide 22. The front slide guide 23 has a hole coaxial with the hole of the tube body 21 and the hole of the back slide guide 22. The hole of the front slide guide 23 is formed in such a size that allows the annular protrusion 3a of the first pipe 3 and the seal unit 70 to pass therethrough. A pair of rail grooves 23a, 23a extending straight in the up-down direction are formed at the left and right on the back surface of the front slide guide 23. The pair of rail grooves 23a, 23a are opposed to the pair of slide guide surfaces 22a, 22a of the back slide guide 22 in the axial direction. The pair of slide guide surfaces 22a, 22a and the pair of rail grooves 23a, 23a guide the retainer 30 in the up-down direction (push-in direction and pull-out direction).

The upper connection member 24 connects an upper portion of the back slide guide 22 and an upper portion of the front slide guide 23 in the axial direction. The lower connection member 25 connects a lower portion of the back slide guide 22 and a lower portion of the front slide guide 23 in the axial direction. Here, the upper connection member 24 and the lower connection member 25 are provided at such positions as not to interfere with the annular protrusion 3a of the first pipe 3 in the axial direction. The area between the upper connection member 24 and the lower connection member 25 opens at both of the left and right.

The pair of body expanding guides 26, 26 are provided on the front surface of the back slide guide 22 and extend so as to be separated downward from left and right ends of the upper connection member 24. The pair of body expanding guides 26, 26 are located on the back slide guide 22 side with respect to the center in the axial direction on the upper connection member 24. That is, a gap is formed between the front slide guide 23 and the pair of body expanding guides 26, 26 in the axial direction. The left and right outer surfaces of the pair of body expanding guides 26, 26 are formed to be sloped surfaces that protrude further outward in the left-right direction as approaching the upper side. The pair of body expanding guides 26, 26 have a function of expanding a pair of second leg portions 33, 33 of the retainer 30 when the retainer 30 moves from the initial position to the insertion position.

The pair of push-in engaged members 27, 27 extend approximately in arc shapes so as to be separated upward from left and right ends of the lower connection member 25. The pair of push-in engaged members 27, 27 are located on the front slide guide 23 side with respect to the center in the axial direction on the lower connection member 25. That is, a gap is formed between the back slide guide 22 and the pair of the push-in engaged members 27, 27 in the axial direction.

(3. Detailed Structure of Retainer 30)

Next, the detailed structure of the retainer 30 will be described with reference to FIG. 3A to FIG. 3D. The retainer 30 is formed in a reversed U shape. The retainer 30 includes a base portion 31, a pair of first leg portions 32, 32, a pair of second leg portions 33, 33, and a pair of release operation portions 34, 34.

Figure 3A:
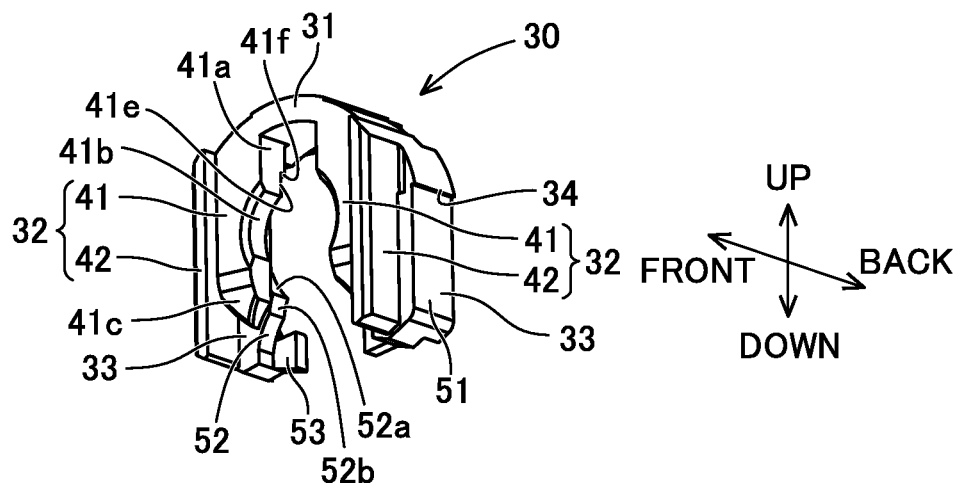
FIG. 3A is a perspective view of the retainer 30 shown in FIG. 1, as seen from the front lower side.
Figure 3B:
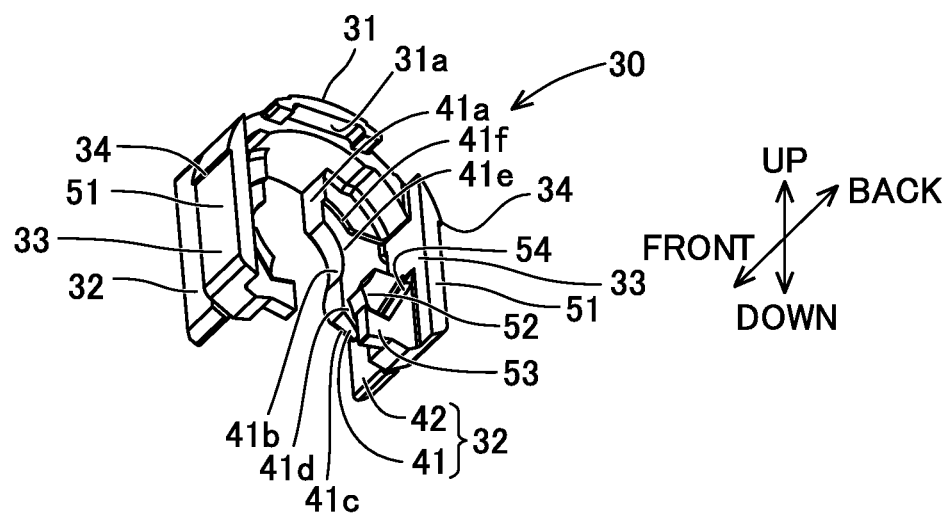
FIG. 3B is a perspective view of the retainer 30 shown in FIG. 1, as seen from the back lower side.
Figure 3C:
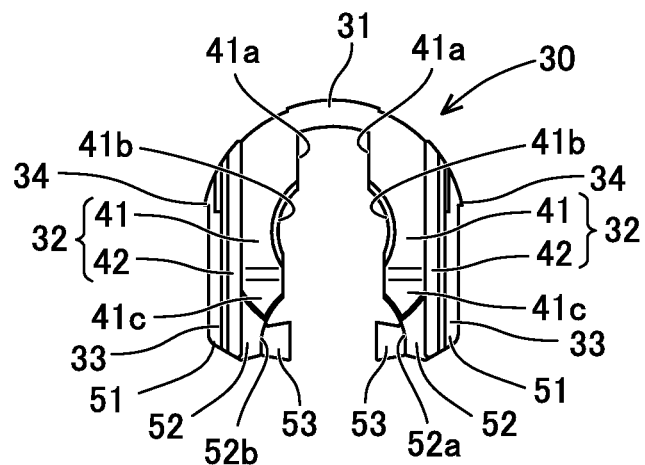
FIG. 3C is a front view of the retainer 30.
Figure 3D:
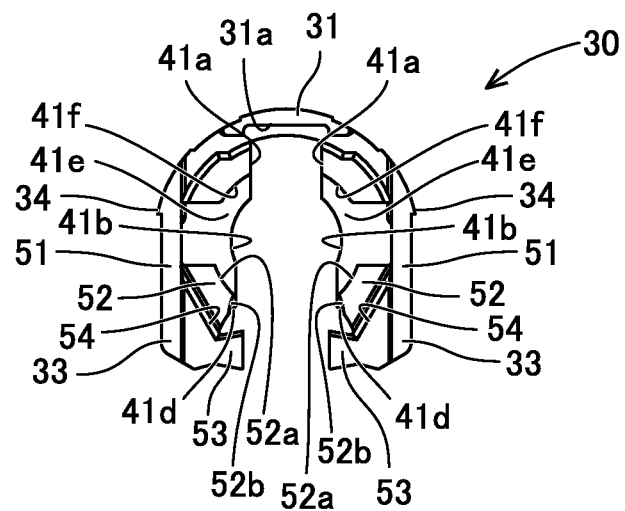
FIG. 3D is a back view of the retainer 30.

The base portion 31 is located at the top of the reversed U shape and is formed in a slightly curved plate shape. As shown in FIG. 3B, a cutout 31a is formed in a lower surface on the back side in the axial direction of the base portion 31. The cutout 31a forms a gap between the back slide guide 22 of the connector body 10 and the base portion 31 in a state in which the retainer 30 is at the confirmation position. For example, the cutout 31a is used for an operator to pull out the retainer 30 by inserting a jig such as a flat head screwdriver.

The pair of first leg portions 32, 32 are formed so as to extend downward (push-in direction of the retainer 30) from both left and right ends on the front side of the base portion 31. The pair of first leg portions 32, 32 are formed so as not to be expandable or so as to be extremely slightly expandable. The expansion amount of the pair of first leg portions 32, 32 is smaller than that of the pair of second leg portions 33, 33. Each first leg portion 32 has a first leg portion body 41 and an insertion guide 42.

The first leg portion bodies 41 extend downward from both of the left and right sides of the base portion 31. Left and right restriction surfaces 41a to be opposed to the left and right surfaces of the upper connection member 24 are provided at mutually opposed positions on the base end side (base portion 31 side) of the first leg portion bodies 41. The separation distance between the left and right restriction surfaces 41a of the pair of first leg portion bodies 41 is substantially equal to the left-right width of the upper connection member 24. In a state in which the retainer 30 is at the confirmation position, the upper connection member 24 of the connector body 10 is held between the pair of left and right restriction surfaces 41a, whereby leftward/rightward movement of the retainer 30 is restricted.

Intermediate portions in the extending direction of the first leg portion bodies 41 have, at mutually opposed positions, arc surfaces 41b corresponding to the outer circumferential surface of the non-end tube portion 3c of the first pipe 3. In a state in which the first pipe 3 is inserted to the regular position and the retainer 30 is at the confirmation position, the arc surfaces 41b are located such that the outer circumferential surface of the non-end tube portion 3c of the first pipe 3 is held between the arc surfaces 41b in the left-right direction.

The first leg portion bodies 41 have first taper surfaces 41c at the distal end sides of the first leg portion bodies 41 (corresponding to the distal end sides of the pair of first leg portions 32), on surfaces (surfaces on the front side) on the side to which the first pipe 3 is inserted. Each first taper surface 41c is formed such that a part closer to the distal end side (downward side) is located toward the back side and a part closer to the base end side (upward side) is located toward the front side. During a period until the first pipe 3 is inserted to the regular position, the first taper surfaces 41c cause the retainer to move from the initial position to the insertion position by the axial-direction pressing force from the annular protrusion 3a.

Each first leg portion body 41 has a provisional come-off-prevention portion 41d on the reverse surface side of the first taper surface 41c, i.e., the surface on the back side. Each provisional come-off-prevention portion 41d is formed at the distal end side of the first leg portion body 41, on the surface (surface on the back side) on the side opposite to the side to which the first pipe 3 is inserted. The provisional come-off-prevention portions 41d are formed in surface shapes perpendicular to the axial direction. In a state in which the first pipe 3 is inserted to the regular position and the retainer 30 is at the initial position, the provisional come-off-prevention portions 41d are engaged with the annular protrusion 3a in the axial direction so as to prevent the first pipe from coming off. However, since the provisional come-off-prevention portions 41d are located at the distal ends of the first leg portion bodies 41, the provisional come-off-prevention portions 41d are engaged with only a small area of the annular protrusion 3a. Therefore, the engagement force by the provisional come-off-prevention portions 41d is not so great.

Each first leg portion body 41 has a full come-off-prevention portion 41e on the reverse surface side of the first taper surface 41c, i.e., the surface on the back side. Each full come-off-prevention portion 41e is formed at an intermediate area in the extending direction of the first leg portion body 41, on the surface (surface on the back side) on the side opposite to the side to which the first pipe 3 is inserted. In particular, the full come-off-prevention portions 41e are formed along the arc surfaces 41b. The full come-off-prevention portions 41e are formed in surface shapes perpendicular to the axial direction. In a state in which the first pipe 3 is inserted to the regular position and the retainer 30 is at the confirmation position, the full come-off-prevention portions 41e are engaged with the annular protrusion 3a in the axial direction so as to prevent the first pipe 3 from coming off.

Further, each first leg portion body 41 has an annular protrusion restricting surface 41f on the base portion 31 side with respect to the full come-off-prevention portion 41e. The annular protrusion restricting surfaces 41f are formed in arc recessed shapes. In a state in which the first pipe 3 is inserted to the regular position and the retainer 30 is at the confirmation position, the annular protrusion restricting surfaces 41f are opposed to the outer circumferential surface of the annular protrusion 3a so as to restrict the first pipe 3 from being displaced relative to the retainer 30.

The insertion guides 42 are provided on the left and right outer sides of the first leg portion bodies 41. The insertion guides 42 are inserted into the rail grooves 23a. That is, the insertion guides 42 allow the retainer 30 to move in the up-down direction relative to the connector body 10 while restricting the attitude of the retainer 30 relative to the connector body 10. Further, by being inserted into the rail grooves 23a, the insertion guides 42 restrict the first leg portions 32 from greatly expanding.

The pair of second leg portions 33, 33 are formed so as to extend downward (push-in direction of the retainer 30) from both left and right ends on the back side of the base portion 31. The pair of second leg portions 33, 33 are provided independently of the pair of first leg portions 32, 32. The pair of second leg portions 33, 33 are expandable more greatly than the pair of first leg portions 32, 32. The pair of second leg portions 33, 33 are provided on the side (back side) opposite to the side to which the first pipe 3 is inserted, with respect to the pair of first leg portions 32, 32.

The second leg portions 33, 33 each include a second leg portion body 51, a guide projection 52, a push-in restricting projection 53, and a leg portion expansion guide 54. The second leg portion bodies 51 extend downward from both left and right ends of the base portion 31. The second leg portion bodies 51 are opposed to the insertion guides 42 of the first leg portions 32 with axial-direction gaps therebetween. The second leg portion bodies 51 are guided in the up-down direction by the slide guide surfaces 22a of the back slide guides 22. The second leg portion bodies 51 are located in axial-direction gaps between the back slide guides 22 and the front slide guides 23. That is, the second leg portion bodies 51 are provided so as to be expandable without being restricted by the connector body 10 on the outer sides in the left-right direction.

The guide projections 52 are provided so as to project from the distal ends of the second leg portion bodies 51 inward in the left-right direction (toward the respective opposed second leg portion bodies 51). The guide projections 52 are located on the front sides of the second leg portion bodies 51. The guide projections 52 are provided with slight gaps in the axial direction from the back surfaces of the first leg portion bodies 41.

The guide projections 52 project inward in the left-right direction most greatly at the center parts in the up-down direction. Surfaces 52a upward of the center parts of the guide projections 52 are located on the back sides of the full come-off-prevention portions 41e. The surfaces 52a upward of the center parts of the guide projections 52 are formed in arc recessed shapes that are along the outer circumferential surface of the annular protrusion 3a in a state in which the first pipe 3 is inserted to the regular position and the retainer 30 is at the confirmation position.

Surfaces 52b downward of the center parts of the guide projections 52 are located on the back sides of the provisional come-off-prevention portions 41d. The surfaces 52b downward of the center parts of the guide projections 52 are formed in arc recessed shapes that are along the outer circumferential surface of the annular protrusion 3a in a state in which the first pipe 3 is inserted to the regular position and the retainer 30 is at the initial position.

The push-in restricting projections 53 are provided so as to project from the distal ends of the second leg portion bodies 51 inward in the left-right directions (toward respective opposed second leg portion bodies 51). The push-in restricting projections 53 are provided on the back sides of the second leg portion bodies 51. That is, the push-in restricting projections 53 are located on the back side with respect to the respective guide projections 52.

In a state in which the second leg portions 33 are not expanded, the push-in restricting projections 53 are engaged with the push-in engaged members 27 of the connector body 10 in the up-down direction. However, in a state in which the second leg portions 33 are expanded, the push-in restricting projections 53 are not engaged with the push-in engaged members 27. On the contrary, in a state in which the second leg portions 33 are expanded, engagement of the push-in restricting projections 53 with the push-in engaged members 27 in the up-down direction is released.

More specifically, in a state in which the retainer 30 is at the initial position and the second leg portions 33 are not expanded, the lower surfaces (surfaces on the distal end sides of the second leg portions 33) of the push-in restricting projections 53 are engaged with the upper ends of the push-in engaged members 27. That is, in a state in which the retainer 30 is at the initial position, the push-in restricting projections 53 are engaged with the push-in engaged members 27, whereby the retainer 30 is restricted from moving from the initial position to the confirmation position.

In a state in which the retainer 30 is at the initial position and the second leg portions 33 are expanded, engagement of the push-in restricting projections 53 with the push-in engaged members 27 is released, so that the retainer 30 is allowed to move from the initial position to the confirmation position.

In a state in which the retainer 30 is at the confirmation position and the second leg portions 33 are not expanded, the upper surfaces (surfaces on the base end sides of the second leg portions 33) of the push-in restricting projections 53 are engaged with the lower surfaces of the push-in engaged members 27. That is, in a state in which the retainer 30 is at the confirmation position, the push-in restricting projections 53 are engaged with the push-in engaged members 27, whereby movement of the retainer 30 in the pull-out direction (opposite to the push-in direction) is restricted.

In a state in which the retainer 30 is at the confirmation position and the second leg portions 33 are expanded, engagement of the push-in restricting projections 53 with the push-in engaged members 27 is released, so that the retainer 30 is allowed to move from the confirmation position to the initial position.

The leg portion expansion guides 54 are located upward of the push-in restricting projections 53 and provided so as to project from the second leg portion bodies 51 inward in the left-right direction. The left and right inner surfaces of the leg portion expansion guides 54 are formed to be sloped surfaces that protrude further outward in the left-right direction as approaching the upper side. The leg portion expansion guides 54, 54 are second taper surfaces opposed to each other and formed such that the opposing distance therebetween is shortened as approaching the distal end sides of the second leg portions 33.

That is, in a state in which the retainer 30 is at the initial position, the leg portion expansion guides 54 are opposed to the left and right outer surfaces of the body expanding guides 26 from the lower side and the left and right outer sides. The leg portion expansion guides 54 have a function of expanding the pair of second leg portions 33, 33 by moving along the body expanding guides 26 when the retainer 30 moves from the initial position to the insertion position.

The pair of release operation portions 34, 34 are provided so as to project outward from both outer surfaces of the base portion 31. The pair of release operation portions 34, 34 are formed so as to allow the operator to catch these release operation portions 34, 34 by the fingers to perform pull-off operation.

(4. Explanation of Operation in Assembly)

Next, operation from insertion of the first pipe 3 into the quick connector 1 until reaching a complete engaged state by the retainer 30 will be described. Hereinafter, a first pipe pre-insertion state, a first pipe insertion uncompleted state, a first pipe insertion completed state, a confirmation state, and a release state will be described.

(4-1. First Pipe Pre-Insertion State)

The first pipe pre-insertion state will be described with reference to FIG. 4A to FIG. 4E. The first pipe pre-insertion state is a state in which the retainer 30 is at the initial position relative to the connector body 10 before the first pipe 3 is inserted into the connector body 10.

Figure 4A:
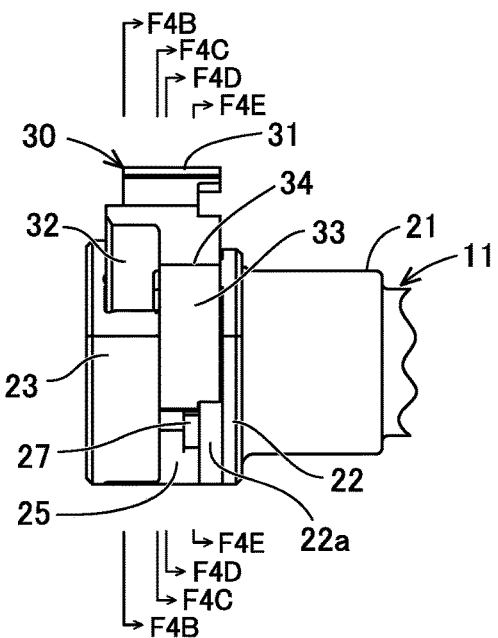
FIG. 4A is a side view showing a state in which the retainer 30 is at an initial position before the first pipe 3 is inserted into the quick connector 1 (first pipe pre-insertion state)
Figure 4B:
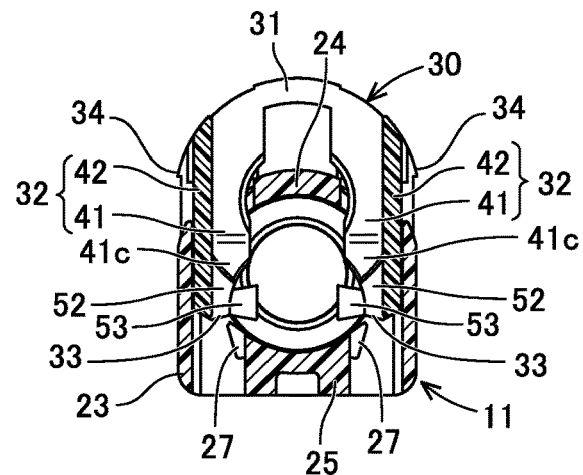
FIG. 4B is a sectional view along line F4B-F4B in FIG. 4A.
Figure 4C:
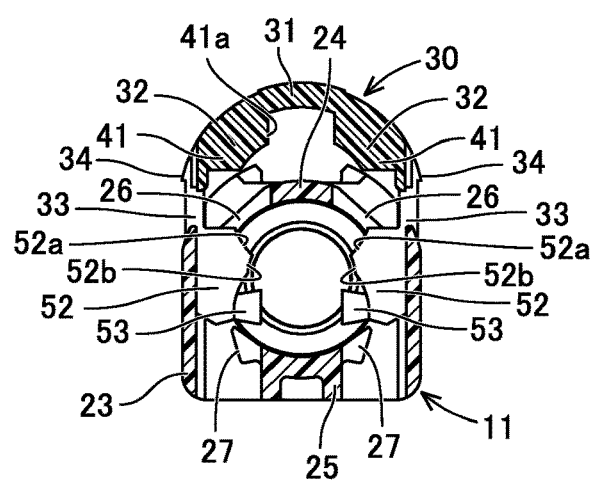
FIG. 4C is a sectional view along line F4C-F4C in FIG. 4A.
Figure 4D:
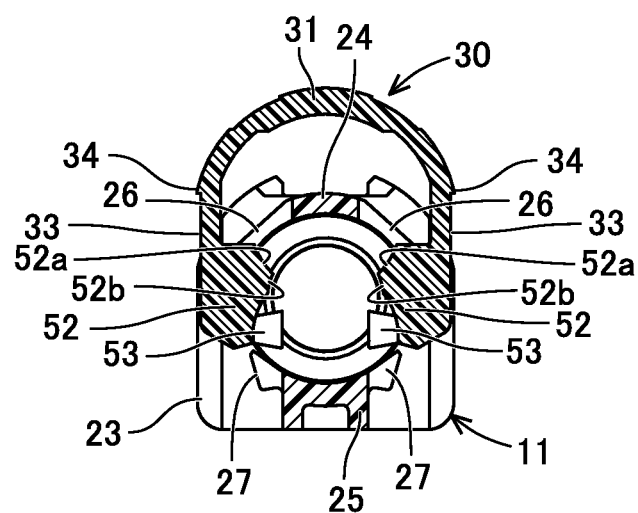
FIG. 4D is a sectional view along line F4D-F4D in FIG. 4A.

The retainer 30 is mounted from the upper side of an axial-direction area between the back slide guide 22 and the front slide guide 23 of the connector body 10. That is, as shown in FIG. 4A and FIG. 4B, the pair of first leg portions 32, 32 and the pair of second leg portions 33, 33 are inserted so as to straddle the upper connection member 24. At this time, a part of the insertion guide 42 of each first leg portion 32 is inserted into the rail groove 23a of the front slide guide 23, and a part of the second leg portion body 51 of each second leg portion 33 is along the slide guide surface 22a of the back slide guide 22.

Figure 4E:
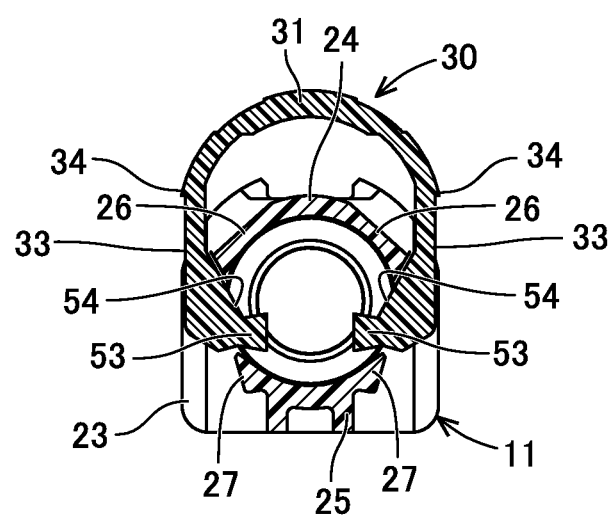
FIG. 4E is a sectional view along line F4E-F4E in FIG. 4A.

As shown in FIG. 4E, the push-in restricting projections 53 of the retainer 30 are located above the push-in engaged members 27. In a state in which the pair of second leg portions 33, 33 are not expanded, the push-in restricting projections 53 are engaged with the push-in engaged members 27 in the push-in direction and outward in the left-right direction. Therefore, in a state in which the retainer 30 is at the initial position and the first pipe 3 is not inserted, the push-in restricting projections 53 are engaged with the push-in engaged members 27, whereby the retainer 30 is restricted from moving from the initial position to the confirmation position. Accordingly, the pair of second leg portions 33, 33 are restricted from expanding while moving in the push-in direction. That is, in a state in which the first pipe 3 is not inserted, the retainer 30 is restricted from being pushed-in from the initial position to the confirmation position.

Further, as shown in FIG. 4E, the leg portion expansion guides 54 of the retainer 30 are located below the body expanding guides 26 of the connector body 10. Therefore, in the case where a pull-out load applied to the retainer 30 is small, the leg portion expansion guides 54 are engaged with the body expanding guides 26 in the pull-out direction, whereby the retainer 30 is restricted from moving from the initial position.

In the case where a great pull-out load is applied to the retainer 30, the leg portion expansion guides 54 come into contact with the body expanding guides 26, whereby the pair of second leg portions 33, 33 expand while moving to the insertion position. Therefore, in a state in which the retainer 30 is at the insertion position, the pair of second leg portions 33, 33 provide the return force for returning to the initial position owing to expansion of the pair of second leg portions 33, 33.

As shown in FIG. 4B to FIG. 4E, in a state in which the retainer 30 is at the initial position, the parts of the retainer 30 are in a state of allowing entry of the end tube portion 3b of the first pipe 3. In addition, as shown in FIG. 4B, the first taper surfaces 41c of the pair of first leg portions 32, 32 are located at the entry position of the annular protrusion 3a of the first pipe 3. In particular, the first taper surfaces 41c are located at such a position as to come into contact with apart upward of the center in the up-down direction of the annular protrusion 3a of the first pipe 3.

(4-2. First Pipe Insertion Uncompleted State)

The first pipe insertion uncompleted state will be described with reference to FIG. 5A to FIG. 5E. The first pipe insertion uncompleted state is a state in which the retainer 30 is at the initial position relative to the connector body 10 and the first pipe 3 is at a certain position frontward in the axial direction with respect to the regular position. In particular, this state is a state in which the annular protrusion 3a of the first pipe 3 is in contact with the first taper surfaces 41c.

When the first pipe 3 is inserted into the connector body 10 from the first pipe pre-insertion state shown in FIG. 4A to FIG. 4E, the end tube portion 3b of the first pipe 3 passes through a left-right-direction space between the pair of first leg portions 32, 32 and a left-right-direction space between the pair of second leg portions 33, 33 of the retainer 30.

Subsequently, the annular protrusion 3a of the first pipe 3 comes into contact with the first taper surfaces 41c of the first leg portions 32, 32. Each first taper surface 41c is formed such that a part closer to the distal end (lower end) side is located toward the back side. Therefore, when the axial-direction pressing force from the annular protrusion 3a is applied to the first taper surfaces 41c, the entire retainer 30 moves from the initial position to the insertion position (upward position) located opposite to the confirmation position.

Figure 5A:
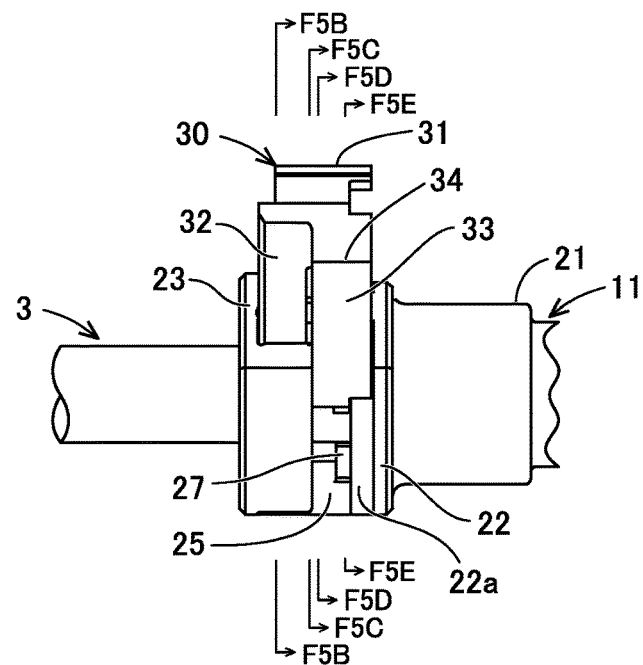
FIG. 5A is a side view showing a state in which the first pipe 3 is inserted to a position in front of a regular position in the quick connector 1 and the retainer 30 is at the initial position (first pipe insertion uncompleted state)
Figure 5B:
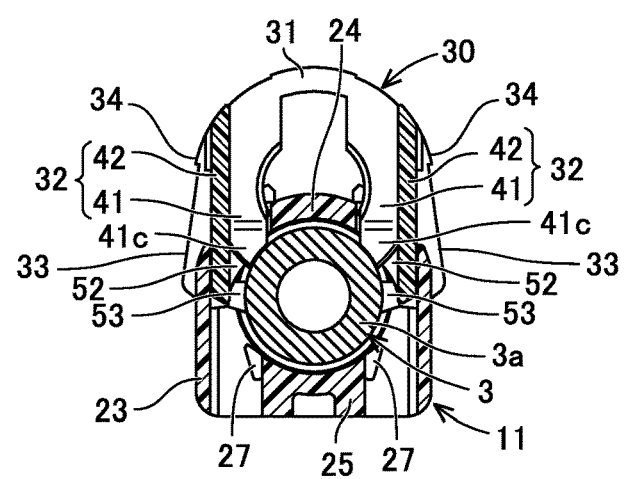
FIG. 5B is a sectional view along line F5B-F5B in FIG. 5A.
Figure 5C:
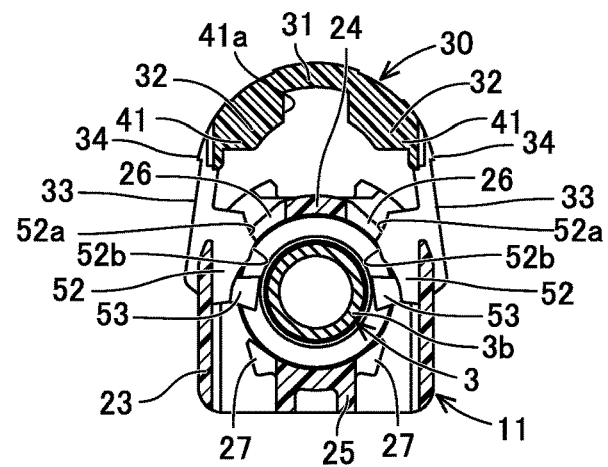
FIG. 5C is a sectional view along line F5C-F5C in FIG. 5A.
Figure 5D:
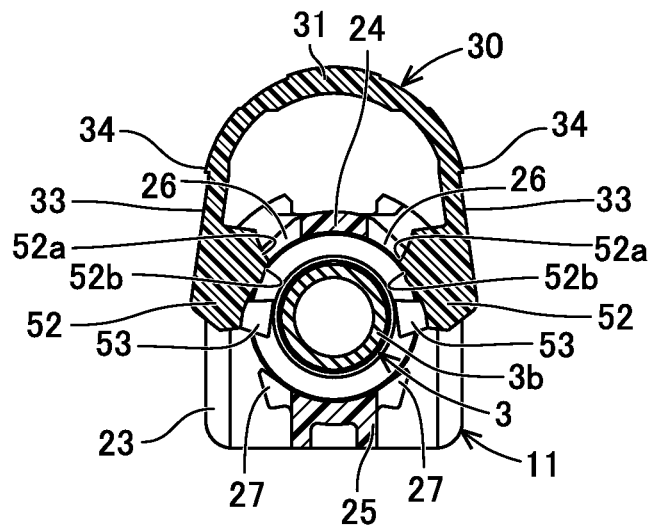
FIG. 5D is a sectional view along line F5D-F5D in FIG. 5A.
Figure 5E:
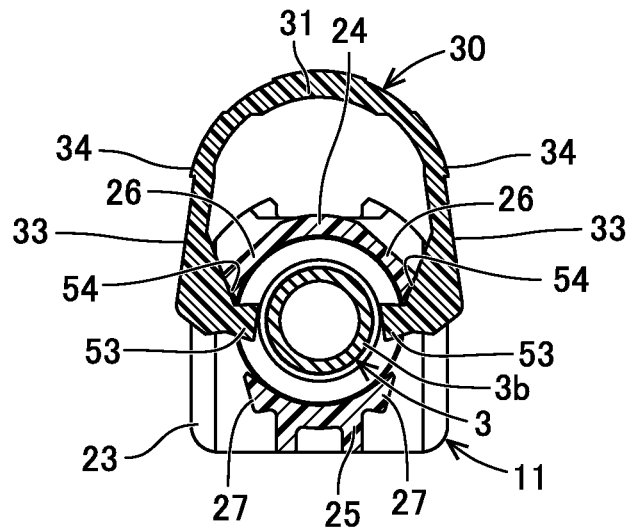
FIG. 5E is a sectional view along line F5E-F5E in FIG. 5A.

When the retainer 30 moves from the initial position to the insertion position, as shown in FIG. 5E, the leg portion expansion guides 54 come into contact with the body expanding guides 26, whereby the pair of second leg portions 33, 33 are expanded. In a state in which the retainer 30 is at the insertion position, the pair of second leg portions 33, 33 exert the return force for returning to the initial position, by expansion of the pair of second leg portions 33, 33. During a period until the first pipe 3 is inserted to the regular position, the retainer 30 moves against the return force from the initial position toward the insertion position. During this period, the pair of first leg portions 32, 32 do not need to expand.

Here, the expansion amount of the pair of second leg portions 33, 33 only has to be such an amount as to exert the return force, and the pair of second leg portions 33, 33 do not need to expand to the extent that allows the annular protrusion 3a to pass therebetween. That is, the return force of the retainer 30 is freely set.

For comparison, in the conventional case, during a period until the first pipe 3 is inserted to the regular position, the pair of leg portions need to expand to the extent that allows the annular protrusion 3a of the first pipe 3 to pass therebetween. That is, the return force of the retainer 30 in the conventional case is a return force in a state in which the pair of leg portions are expanded to the extent that allows the annular protrusion 3a of the first pipe 3 to pass therebetween. In addition, the insertion load of the first pipe 3 depends on the return force of the retainer 30 described above. Therefore, according to the present embodiment, the insertion load of the first pipe 3 is reduced as compared to the conventional case.

During a period until the first pipe 3 is inserted to the regular position, the retainer 30 moves from the initial position to the insertion position as described above. That is, in a state in which the retainer 30 is pushed-in, the first pipe 3 is not inserted to the regular position. Therefore, operator's insertion operation for the first pipe 3 and operator's confirmation operation by the retainer 30 are separated from each other.

During a period until the first pipe 3 is inserted to the regular position, the annular protrusion 3a moves in the axial direction while being in contact with the pair of first leg portions 32, 32. The pair of second leg portions 33, 33 are located on the back side with respect to the pair of first leg portions 32, 32. Therefore, the pair of second leg portions 33, 33 do not come into contact with the annular protrusion 3a during a period until the annular protrusion 3a has passed through the pair of first leg portions 32, 32.

(4-3. First Pipe Insertion Completed State)

The first pipe insertion completed state will be described with reference to FIG. 6A to FIG. 6E. The first pipe insertion completed state is a state in which the retainer 30 is at the initial position relative to the connector body 10 and the first pipe 3 is at the regular position.

When the first pipe 3 is further inserted toward the back side from the first pipe insertion uncompleted state shown in FIG. 5A to FIG. 5E, the annular protrusion 3a passes between the first leg portion bodies 41 of the first leg portions 32 and the annular protrusion 3a reaches the position where the guide projections 52 are present, as shown in FIG. 6A to FIG. 6E. The position of the first pipe 3 when the annular protrusion 3a is at the position of the guide projections 52 is the regular position.

When the first pipe 3 reaches the regular position and the annular protrusion 3a is located at the lower side of the guide projections 52, engagement between the first leg portion bodies 41 and the annular protrusion 3a is released. Thus, by the return force of the pair of second leg portions 33, 33, the expanding deformation amount of the pair of second leg portions 33, 33 is reduced at once, so that the retainer 30 returns to the initial position. Therefore, when the first pipe 3 reaches the regular position, sound due to return from expanding deformation of the pair of second leg portions 33, 33 occurs. In particular, due to vibration of the retainer 30, high-frequency sound occurs. Owing to this sound, the operator confirms that the first pipe 3 has reached the regular position.

Figure 6A:
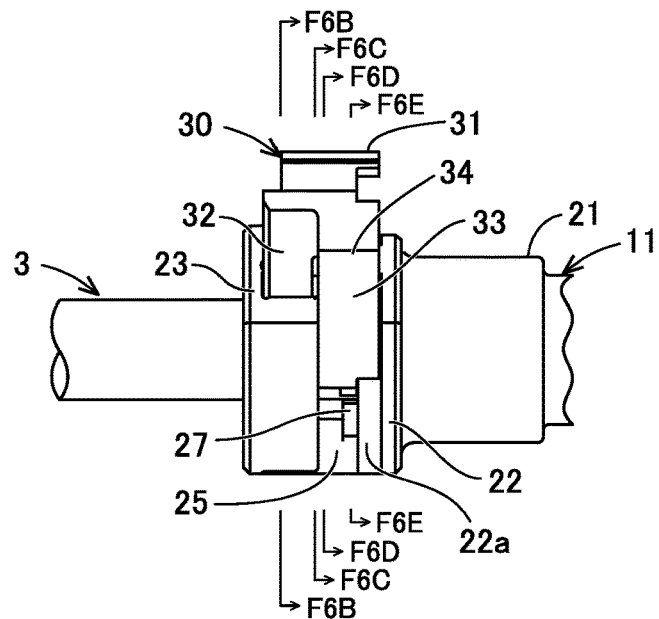
FIG. 6A is a side view showing a state in which the first pipe 3 is inserted to the regular position in the quick connector 1 and the retainer 30 is at the initial position (first pipe insertion completed state)
Figure 6B:
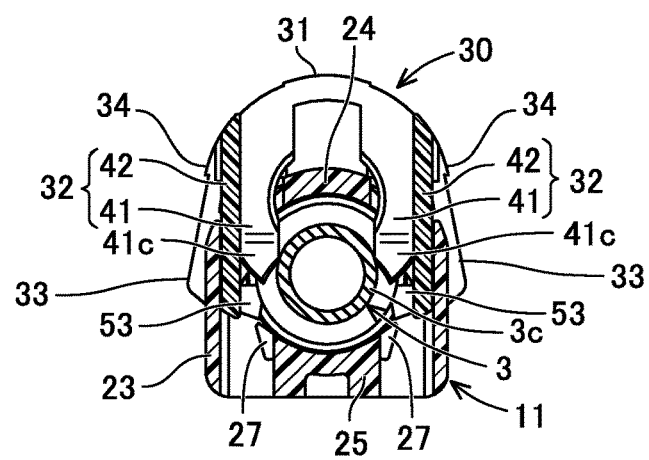
FIG. 6B is a sectional view along line F6B-F6B in FIG. 6A.
Figure 6C:
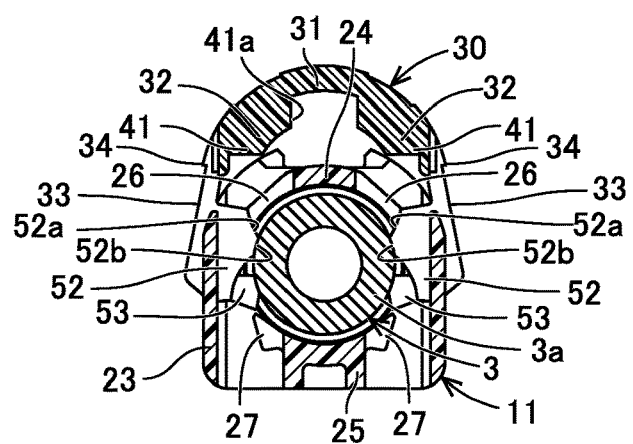
FIG. 6C is a sectional view along line F6C-F6C in FIG. 6A.
Figure 6D:
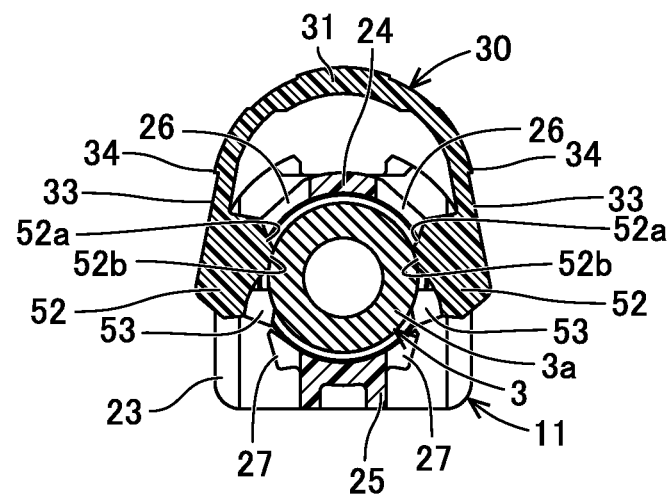
FIG. 6D is a sectional view along line F6D-F6D in FIG. 6A.
Figure 6E:
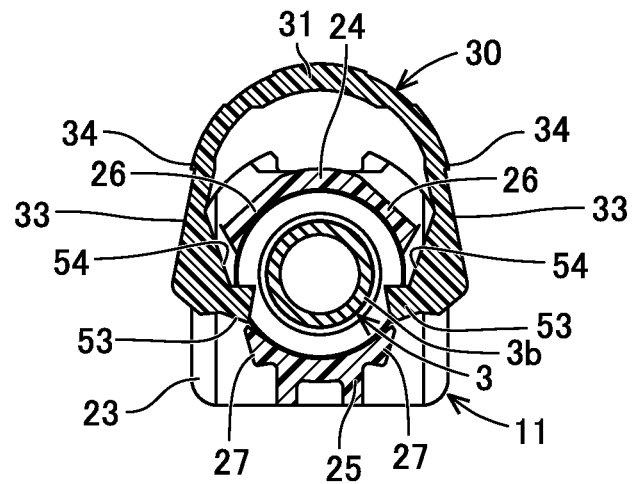
FIG. 6E is a sectional view along line F6E-F6E in FIG. 6A.

As shown in FIG. 6D, in a state in which the first pipe 3 is at the regular position, the lower-side surfaces 52b of the guide projections 52 are in contact with the annular protrusion 3a, and the pair of second leg portions 33, 33 are in a slightly expanded state. In this state, as shown in FIG. 6B and FIG. 6C, the annular protrusion 3a is opposed to the provisional come-off-prevention portions 41d. That is, the provisional come-off-prevention portions 41d are engaged with the annular protrusion 3a in the axial direction, whereby the provisional come-off-prevention portions 41d prevent the first pipe 3 from coming off.

Here, in the case where a pull-out load is applied to the first pipe 3 in the axial direction, the annular protrusion 3a presses the provisional come-off-prevention portions 41d toward the front side. The provisional come-off-prevention portions 41d are formed in surface shapes perpendicular to the axial direction. The pair of first leg portions 32, 32 are not expandable or are extremely slightly expandable. That is, the pair of first leg portions 32, 32 are substantially not expandable. Therefore, as long as the retainer 30 is at the initial position, the annular protrusion 3a does not pass over the provisional come-off-prevention portions 41d.

(4-4. Confirmation State)

The confirmation state will be described with reference to FIG. 7A to FIG. 7F. The confirmation state is a state in which the first pipe 3 is at the regular position and the retainer 30 is at the confirmation position.

In the first pipe insertion completed state shown in FIG. 6A to FIG. 6E, the lower-side surfaces 52b of the guide projections 52 are in contact with the annular protrusion 3a. From this state, if a load for pushing-in to the connector body 10 is applied to the retainer 30, the lower-side surfaces 52b of the guide projections 52 are guided by being in contact with the outer circumferential surface of the annular protrusion 3a, whereby the pair of second leg portions 33, 33 expand while moving downward. At the same time, by expansion of the pair of second leg portions 33, 33, engagement of the push-in restricting projections 53 of the retainer 30 with the push-in engaged members 27 is released. Thus, the retainer 30 is allowed to move from the initial position to the confirmation position.

As the push-in load continues being applied to the retainer 30, as shown in FIG. 7A to FIG. 7F, the retainer 30 moves to the confirmation position while the first leg portion bodies 41 are guided by the rail grooves 23a. At this time, guiding for the guide projections 52 by the outer circumferential surface of the annular protrusion 3a is released so that the pair of second leg portions 33, 33 return from the expanded state. As a result, the push-in restricting projections 53 are located on the lower sides of the push-in engaged members 27. Thus, the push-in restricting projections 53 are engaged with the lower surfaces of the push-in engaged members 27.

Further, in this state, the upper connection member 24 of the connector body 10 is held between the left and right restriction surfaces 41a of the retainer 30. Thus, the retainer 30 is more firmly positioned relative to the connector body 10.

Further, the annular protrusion 3a is located so as to be opposed to the annular protrusion restricting surfaces 41f of the first leg portions 32 and also opposed to the upper-side surfaces 52a of the guide projections 52. Thus, the annular protrusion 3a and the retainer 30 are positioned relative to each other. Thus, the annular protrusion 3a is opposed to the full come-off-prevention portions 41e. That is, the full come-off-prevention portions 41e are engaged with the annular protrusion 3a in the axial direction, whereby the full come-off-prevention portions 41e prevent the first pipe 3 from coming off. The range in which the full come-off-prevention portions 41e are opposed to the annular protrusion 3a is larger than the range in which the provisional come-off-prevention portions 41d are opposed to the annular protrusion 3a. Thus, in a state in which the retainer 30 is at the confirmation position, the retainer 30 prevents coming-off of the first pipe 3 in the axial direction with a strong force.

(4-5. Release State)

The release state will be described with reference to FIG. 5B to FIG. 5E, FIG. 6A to FIG. 6E, and FIG. 7A to FIG. 7F. In maintenance or the like, the first pipe 3 may be pulled out from the connector body 10. The release state is a state in which the first pipe 3 is inserted to the regular position and the first pipe 3 is allowed to be pulled out from the connector body 10.

First, the retainer 30 is moved to the initial position shown in FIG. 6A to FIG. 6E from the confirmation position shown in FIG. 7A to FIG. 7F. For this purpose, the operator expands the pair of second leg portions 33, 33 with the fingers catching the pair of release operation portions 34, 34 of the retainer 30. Thus, engagement of the upper surfaces of the push-in restricting projections 53 of the retainer 30 with the lower surfaces of the push-in engaged members 27 of the connector body 10 is released. In this state, by the operator performing pull-out operation of the retainer 30, the retainer 30 moves from the confirmation position to the initial position.

Instead of or in addition to catching the pair of release operation portions 34, 34, the operator may insert a jig such as a flat head screwdriver into the cutout 31a (shown in FIG. 3B) of the base portion 31, to move the retainer 30 from the confirmation position to the initial position.

Even when the retainer 30 has moved to the initial position, as shown in FIG. 6A to FIG. 6E, the provisional come-off-prevention portions 41d are engaged with the annular protrusion 3a in the axial direction. Therefore, in a state in which the retainer 30 is at the initial position, the operator further performs pull-out operation of the retainer 30 with the fingers catching the pair of release operation portions 34, 34. That is, the operator performs pull-out operation against the return force of the pair of second leg portions 33, 33. Accordingly, the retainer 30 moves to the same position as the insertion position shown in FIG. 5B to FIG. 5E against the return force of the pair of second leg portions 33, 33. That is, engagement between the provisional come-off-prevention portions 41d of the pair of first leg portions 32, 32 and the annular protrusion 3a is released, so that the retainer 30 comes into the release state. In this release state, the operator is allowed to pull out the first pipe 3 from the connector body 10.

What is claimed is:

1. A quick connector comprising:
a connector body into which a first pipe having an annular protrusion is to be inserted; and
a retainer configured to be movable from an initial position to a confirmation position relative to the connector body through push-in operation in a direction crossing an axial direction of the connector body in a state in which the first pipe is inserted to a regular position in the axial direction of the connector body, the retainer being configured to be engaged with the annular protrusion in the axial direction at the confirmation position so as to prevent the first pipe from coming off, wherein
the retainer is movable to an insertion position opposite to the confirmation position from the initial position, and has a return force for returning to the initial position in a state in which the retainer is at the insertion position,
the retainer includes
a base portion,
a pair of first leg portions extending in a push-in direction from both ends of the base portion, and
a pair of second leg portions extending in the push-in direction from both ends of the base portion and provided independently of the pair of first leg portions, the pair of second leg portions being expandable more greatly than the pair of first leg portions, the pair of second leg portions being located on a side opposite to a side to which the first pipe is to be inserted, with respect to the pair of first leg portions,
the pair of first leg portions have first taper surfaces, at distal end sides of the pair of first leg portions, on surfaces on the side to which the first pipe is to be inserted,
the first taper surfaces cause the retainer to move from the initial position to the insertion position by an axial-direction pressing force from the annular protrusion, during a period until the first pipe is inserted to the regular position,
during the period until the first pipe is inserted to the regular position, the pair of second leg portions are engaged with the connector body so that the retainer is restricted from moving from the initial position to the confirmation position, and
in a state in which the first pipe is inserted to the regular position, when the pair of second leg portions expand due to contact with an outer circumferential surface of the annular protrusion, the engagement with the connector body is released, thus allowing the retainer to move from the initial position to the confirmation position.

2. The quick connector according to claim 1, wherein
the connector body includes body expanding guides,
the pair of second leg portions include leg portion expansion guides, and
the pair of second leg portions expand by the leg portion expansion guides coming into contact with the body expanding guides when the retainer moves from the initial position to the insertion position, and provide the return force for returning to the initial position owing to expansion of the pair of second leg portions in a state in which the retainer is at the insertion position.

3. The quick connector according to claim 2, wherein
the leg portion expansion guides of the pair of second leg portions are second taper surfaces opposed to each other and formed such that an opposing distance therebetween is shortened as approaching distal end sides of the pair of second leg portions.

4. The quick connector according to claim 1, wherein
the pair of second leg portions are formed so as not to come into contact with the annular protrusion during a period until the annular protrusion has passed through the pair of first leg portions.

5. The quick connector according to claim 1, wherein
the pair of first leg portions have provisional come-off-prevention portions on back surface sides of the first taper surfaces, and
in a state in which the first pipe is inserted to the regular position and the retainer is at the initial position, the provisional come-off-prevention portions are engaged with the annular protrusion in the axial direction so as to prevent the first pipe from coming off.

6. The quick connector according to claim 1, wherein
the pair of first leg portions have full come-off-prevention portions on back surface sides of the first taper surfaces, and
in a state in which the first pipe is inserted to the regular position and the retainer is at the initial position, the full come-off-prevention portions are engaged with the annular protrusion in the axial direction so as to prevent the first pipe from coming off.

7. The quick connector according to claim 1, wherein
the pair of second leg portions include push-in restricting projections on distal end sides of the pair of second leg portions,
in a state in which the first pipe is not inserted into the connector body and the retainer is at the initial position, the push-in restricting projections are engaged with the connector body so that the retainer is restricted from moving from the initial position to the confirmation position, and
in a state in which the first pipe is inserted to the regular position and the retainer is at the initial position, the engagement of the push-in restricting projections with the connector body is released by the pair of second leg portions expanding due to contact with the outer circumferential surface of the annular protrusion.

8. The quick connector according to claim 1, wherein
in a state in which the first pipe is inserted to the regular position and the retainer is at the initial position, when the retainer is moved to the insertion position to come into a release state through a pull-out operation against the return force, the first pipe is allowed to be pulled out from the connector body.

* * * * *